(12) United States Patent
Iwashita

(10) Patent No.: US 10,721,235 B2
(45) Date of Patent: Jul. 21, 2020

(54) COMMUNICATION SYSTEM, COMMUNICATION CONTROL APPARATUS, AND RECORDING MEDIUM

(71) Applicant: Shinya Iwashita, Kanagawa (JP)

(72) Inventor: Shinya Iwashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 262 days.

(21) Appl. No.: 15/723,768

(22) Filed: Oct. 3, 2017

(65) Prior Publication Data

US 2018/0103040 A1 Apr. 12, 2018

(30) Foreign Application Priority Data

Oct. 7, 2016 (JP) ................................. 2016-199573

(51) Int. Cl.
*H04L 29/06* (2006.01)
(52) U.S. Cl.
CPC .......... *H04L 63/101* (2013.01); *H04L 63/107* (2013.01); *H04L 63/20* (2013.01)
(58) Field of Classification Search
CPC ............... G06F 2221/2141; G06F 8/61; H04L 63/0272; H04L 63/101
See application file for complete search history.

(56) References Cited

U.S. PATENT DOCUMENTS

| 7,353,260 B1* | 4/2008 | Senum ..................... H04L 63/08 709/217 |
| 2003/0115344 A1* | 6/2003 | Tang ................... H04L 63/0272 709/229 |
| 2015/0078362 A1 | 3/2015 | Kunieda et al. |
| 2015/0215841 A1* | 7/2015 | Hsu ......................... H04L 43/12 370/328 |
| 2018/0007004 A1* | 1/2018 | Basler ................. H04L 63/0236 |

FOREIGN PATENT DOCUMENTS

| JP | 2015-084515 | 4/2015 |
| WO | WO2013/150925 A1 | 10/2013 |

\* cited by examiner

*Primary Examiner* — Olugbenga O Idowu
(74) *Attorney, Agent, or Firm* — Oblon, McClelland, Maier & Neustadt, L.L.P.

(57) ABSTRACT

A communication control apparatus includes circuitry that includes a memory that stores a first list including a first condition that associates an address indicating a location on a network with information and a second list including a second condition that associates identification information identifying a communication protocol with information indicating whether or not allow communication using the communication protocol and circuitry that outputs display control information to display the first list and the second list, receives an input of a request to modify the displayed first list and the second list, generates communication control information in accordance with the modified first list and the second list in response to the input request, and transfers the generated communication control information via the network to a transfer apparatus, to cause the transfer apparatus to control communication to be performed via a first communication interface for connecting the network and a second communication.

9 Claims, 9 Drawing Sheets

COMMUNICATION SYSTEM, COMMUNICATION CONTROL APPARATUS, AND RECORDING MEDIUM

CROSS-REFERENCE TO RELATED APPLICATION

This patent application is based on and claims priority pursuant to 35 U.S.C. § 119(a) to Japanese Patent Application No. 2016-199573, filed on Oct. 7, 2016 in the Japan Patent Office, the entire disclosure of which is hereby incorporated by reference herein.

BACKGROUND

Technical Field

The present invention relates to a communication system, a communication control apparatus, and a non-transitory recording medium storing a communication control program.

Background Art

Recently, in organizations such as corporations, it is general to construct a wired Local Area Network (LAN) and wireless LAN within the organization (referred to as intranet) and connect information apparatuses used in the organization communicably with each other via the intranet. In case of connecting a guest terminal used by a guest from the outside world to the intranet described above and enabling the guest using the guest terminal to use the information apparatuses connected to the intranet, from the viewpoint of security, it is desired to restrict usable network resources and monitor usage using usage log etc.

SUMMARY

Example embodiments of the present invention provide a novel communication control apparatus that includes circuitry that includes a memory that stores a first list including a first condition that associates an address indicating a location on a network with information indicating whether or not to allow communication with a destination identified with the address and a second list including a second condition that associates identification information identifying a communication protocol with information indicating whether or not allow communication using the communication protocol and circuitry that outputs display control information to display the first list and the second list, receives an input of a request to modify the first list and the second list being displayed, generates communication control information in accordance with the first list and the second list each being modified in response to the input request, and transfers the communication control information being generated via the network to a transfer apparatus, to cause the transfer apparatus to control communication to be performed via a first communication interface for connecting the network and a second communication interface for connecting a terminal apparatus in accordance with the communication control information being transferred.

Further example embodiments of the present invention provide a communication system and a non-transitory recording medium storing a communication control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

Figure 1:
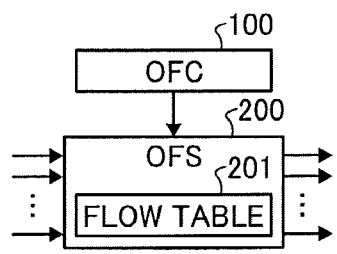
FIG. 1 is a block diagram illustrating a configuration based on OpenFlow schematically as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

Before describing embodiments, for the sake of helping understand, technologies applicable to the embodiments are schematically described below. Table 1 illustrates Open Systems Interconnection (OSI) reference model in contradistinction with communication protocols applied to each layer of the OSI reference model. The OSI reference model is a model dividing a communication function into a layer structure laid down by the International Organization for Standardization (ISO). The OSI reference model is frequently used as an example of a typical layer structure of the network.

TABLE 1

| OSI reference model | Example of protocol/standard |
|---|---|
| Application layer | HTTP, FTP |
| Presentation layer | |
| Session layer | |
| Transport layer | TCP, UDP |
| Network layer | IP |
| Data link layer | IEEE 802.3 |
| Physical layer | IEEE 802.11 |

In the OSI reference model, the communication function is divided into seven layers, the application layer, presentation layer, session layer, transport layer, network layer, data link layer, and physical layer from top down. In Table 1, protocols and specifications used in network communication correspond to the layers described above.

In Table 1, for example, protocols such as Hypertext Transfer Protocol (HTTP) and File Transfer Protocol (FTP) are associated with three upper layers among layers in the OSI reference model, the application layer, presentation layer, and session layer. Likewise, protocols such as Transmission Control Protocol (TCP) and User Datagram Protocol (UDP) are associated with the transport layer, and protocol such as Internet Protocol (IP) is associated with the network layer for example. In addition, for example, IEEE (the Institute of Electrical and Electronics Engineers) 802.3 (Ethernet (registered trademark)) and IEEE 802.11 (wireless LAN) are associated with two layers from the bottom, the data link layer and physical layer.

In actual communication, protocol and specification that takes on each function depending on application and environment are selected to perform communication.

Nowadays, in performing communication on the Internet and LAN, a concept of transparency is important. The transparency indicates that a layer is independent from each other and the layer does not depend on a protocol selected in other layers basically. For example, IP works similarly regardless of whether the lower layer is Ethernet or wireless LAN.

As a result, for example, in performing communication from a terminal A (e.g., a tablet computer device) to a terminal B (personal computer) via wireless LAN, Ethernet, optical fiber, and Ethernet sequentially going through different physical layers and data link layers on the way of the communication, protocols in layers upper than IP operate without recognizing the difference, and it is possible to perform the communication smoothly.

Next, as a technical concept applicable to the embodiments, SDN is described below schematically.

Conventionally, in network environments such as intranet closed within the organization, it is general that a dedicated engineer who knows how to configure and operate LAN switches and wireless LAN access points distributed by vendors well constructs the network environment. In the network environments described above, only authentication methods and operating methods using solutions provided by the vendor are available (so-called "vendor lock-in" status), and it is difficult that the organization configures the authentication methods and operating methods freely.

By contrast, recently, in order to construct a network unique to the organization as the user, a concept called SDN that may control a data flow in the network using software only is attracting attention. Related to SDN, as typical configuration technologies element attracting attention, "virtualization of network" and "OpenFlow" as one of methods (protocols) for controlling communication in the virtualized network and a vendor-independent open specification exist.

For example, the virtualization of network is a group of technologies including multiple configuration components including virtual interface technology that presents one physical interface as multiple physical interfaces (or multiple physical interface as one physical interface vice versa) and virtual switch technology that connects and relays the virtual interfaces. In the virtualization of network, in combination with physical network apparatuses, virtual network components, and protocol technologies, logical network configuration is separated from physical network configuration virtually, and it is possible to construct a network flexibly independent from the physical configuration.

In OpenFlow (registered trademark), communication is considered as an end-to-end flow, and it is possible to perform routing control, distributing load, and optimization etc. in units of the flow. More specifically, OpenFlow implements the features by changing into centralized control scheme instead of transferring and analyzing each data packet distributed-autonomously at relay apparatuses etc. in a data communication route.

FIG. 1 is a block diagram illustrating a configuration based on OpenFlow schematically in this embodiment. In OpenFlow, "control plane" that analyzes data, determines destination, and controls determination is separated from "data plane" that transmits packet physically only. In OpenFlow, an OpenFlow controller 100 (OFC 100 in FIG. 1) controls the control plane and commands a transfer rule, and an OpenFlow switch 200 (OFS 200 in FIG. 1) controls the data plane and transmits packets under control of the OpenFlow controller 100. More specifically, the OpenFlow switch 200 transmits packets in accordance with a flow table 201 included in the OpenFlow switch 200 added and overwritten by the OpenFlow controller 100. By adopting the configuration described above, it is possible to utilize OpenFlow as a tool for controlling the virtualization of network described above.

In the below description, the OpenFlow controller is referred to as OFC, and the OpenFlow switch is referred to as OFS.

Figure 2:
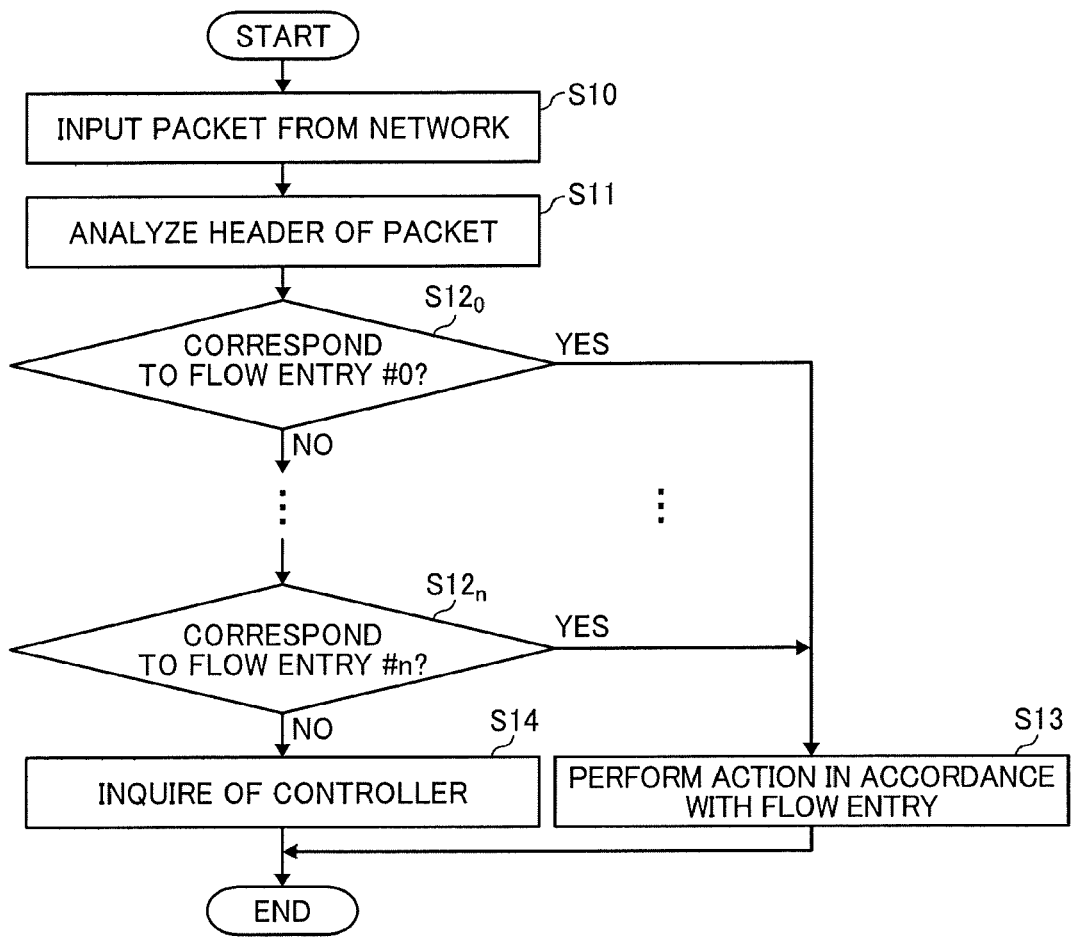
FIG. 2 is a flowchart illustrating an operation performed when OFS receives a data packet as an embodiment of the present invention.

FIG. 2 is a flowchart illustrating an operation performed when the OFS 200 receives a data packet in this embodiment.

After a packet is input from a network in S10, the OFS 200 reads header information written in the top of the packet and analyzes the read header information in S11. The header is created for each protocol described in Table 1, and the OFS 200 may extract specified information from header equal to or lower than the transport layer. Examples of the header information (identification information) extracted by the OFS 200 are source Media Access Control (MAC) address, destination MAC address, IP address, TCP port number, and UDP port number etc. Here, an address such as MAC address and IP address etc. indicates a location on a network. It should be noted that MAC address is associated with the data link layer.

The OFS 200 compares the information extracted from the header information described above with a condition of a processing rule (flow entry) already stored. In the flow entry, a way of processing a packet is described. For example, in the flow entry, it is described that a packet whose destination IP address is "192.168.1.2" is transferred from port 3 of the OFS 200. In the flow entry, a condition describing the type of the packet is referred to as a matching rule (match), and a part describing the way of processing the packet is referred to as "action".

The group of flow entries stored in the OFS 200 is referred to as the flow table 201. In the flow table 201, priorities are configured for each flow entry respectively. With reference to priorities of each flow entry included in the flow table 201, the condition is compared from the flow entry whose priority is higher sequentially in steps $S12_0$ to $S12_n$. In FIG. 2, the flow table 201 includes flow entries #0 to # n whose number is n, the flow entry #0 is the highest priority, and the flow entry # n is the lowest priority.

If a flow entry (communication control information) whose condition corresponds to the input packet is found, the OFS 200 stops checking (YES in any one of steps $S12_0$ to $S12_n$). Subsequently, the operation proceeds to step S13, and an action in accordance with the detected flow entry is performed.

By contrast, if a flow entry whose condition corresponds to the input packet is not found (NO in all of steps $S12_0$ to $S12_n$), the operation proceeds to step 14, and the OFS 200 transfers a packet_in message to the OFC 100 to inquire about the operation.

The OFS 200 may not only transfer/discard a packet but also rewrite the head information of the packet. By rewriting destination address or source address, it is possible to implement a function similar to existing network apparatuses such as a Network Address Translation (NAT) and a router etc., and it is possible to implement complicated and dynamic communication control that is difficult to implement by using the existing network apparatuses depending on usage.

First Embodiment

Figure 3:
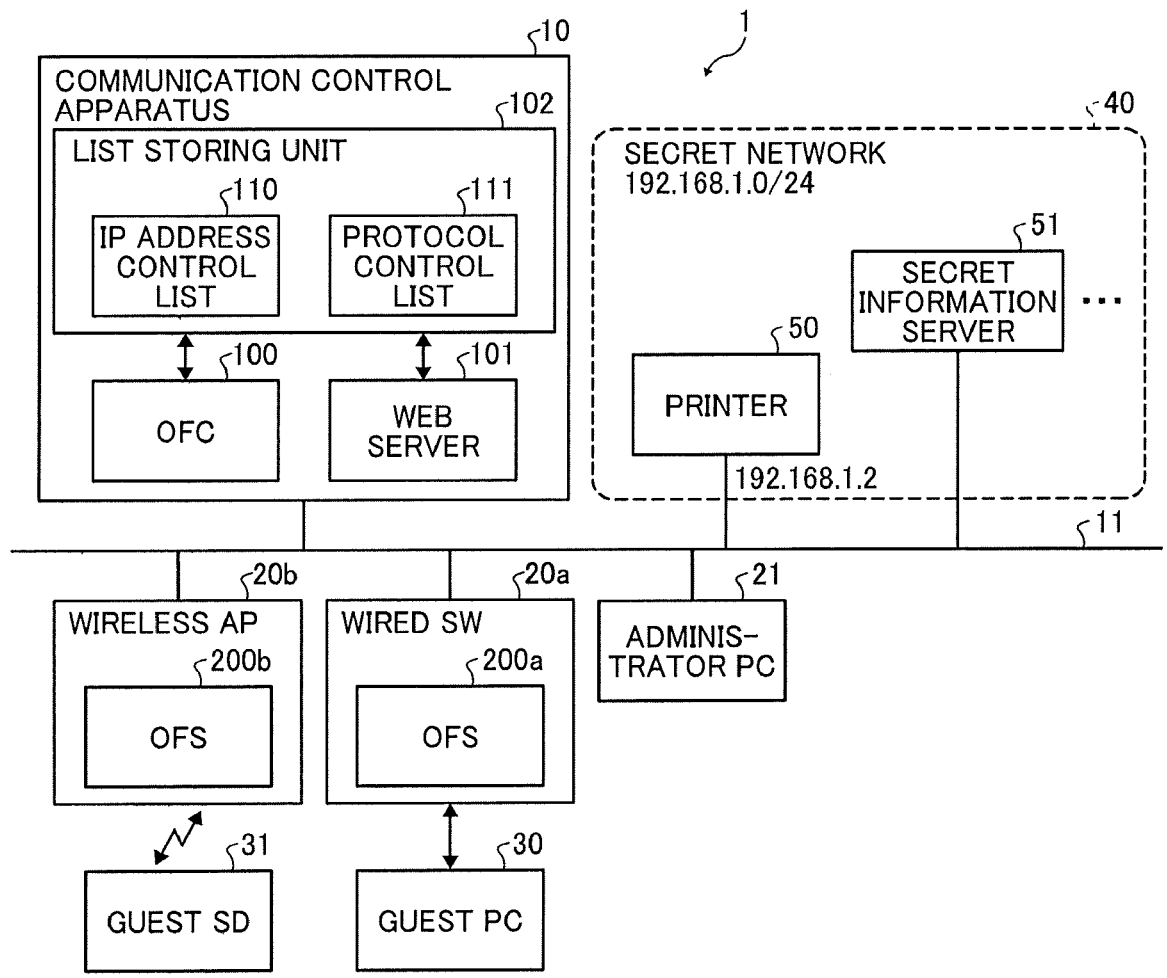
FIG. 3 is a block diagram illustrating a configuration of a communication system as an embodiment of the present invention.

Next, the first embodiment is described below. FIG. 3 is a block diagram illustrating a configuration of a communication system 1 in this embodiment. In FIG. 3, the communication system 1 includes a communication control apparatus (a control apparatus) 10, a wired switch (SW) (a transfer apparatus) 20a that is connected to the communication control apparatus 10 via a network 11, a wireless access point (AP) (a transfer apparatus) 20b, and an administrator personal computer (PC) 21. It is possible that the communication system 1 includes either one of the wired SW 20a and the wireless AP 20b. Otherwise, it is also possible that the communication system 1 includes multiple wired SWs 20a and the wireless APs 20b furthermore.

A secret network 40 is connected to the network 11. In FIG. 3, the secret network 40 includes a printer 50 and a secret information server 51. For example, the secret network 40 is an intranet (organization LAN) located in an organization and restricts access from outside of the organization.

The communication control apparatus 10 includes the OFC 100, a web server 101, and a list storing unit 102. The list storing unit 102 writes an IP address control list 110 and a protocol control list 111 in a recording medium and reads the IP address control list 110 and the protocol control list 111 from the recording medium. In addition, each of the wired SW 20a and the wireless AP 20b includes an OFS 200a and OFS 200b respectively. The OFC 100 generates a flow entry configured to the OFSs 200a and 200b using the IP address control list 110 and the protocol control list 111 included in the list storing unit 102 and registers the generated flow entry in the OFSs 200a and 200b.

A guest PC 30 is an external terminal apparatus used by a guest who is outside of the communication system 1 such as a user who does not have authorization information for logging in the communication system 1. It is possible to use a generic PC for the external terminal apparatus as an information processing apparatus that may be connected to a wired network such as a desktop PC and a laptop PC. The guest PC 30 is connected to the wired SW 20a by using a wired network. Under control of the OFS 200a included in the wired SW 20a, the guest PC 30 may communicate with the network 11 via the wired SW 20a.

Similarly, the guest smart device (SD) 31 is also an external terminal apparatus used by a guest. For example, the guest SD 31 is a smart device as an information processing apparatus that may be connected to a network by using a wireless LAN such as a tablet device and a smartphone. It is possible to include a laptop PC that may be connected to a network (LAN) by using a wireless network in the smart device. The guest SD 31 is connected to the wireless AP 20b via the wireless LAN and communicates with the network 11 via the wireless AP 20b under control of the OFS 200b included in the wireless AP 20b.

The web server 101 provides a user interface to outside for the communication control apparatus 10. For example, by accessing the web server 101 in the communication control apparatus 10 via the network 11 from the administrator PC 21, the administrator may browse and edit (modify) the IP address control list 110 and the protocol control list 111.

A secret network 40 is connected to the network 11. The secret network 40 includes multiple secret information servers 51 storing secret information that should not be released to guests. In addition, the secret network 40 further includes a printer 50. In FIG. 3, for example, network address "192.168.1.0/24" is assigned to the secret network 40, and 1P address "192.168.1.2" is assigned to the printer 50. Among components connected to the network 11, access to inside the secret network 40 by the guest PC 30 and the guest SD 31 is limited, and access to outside the secret network 40 by the guest PC 30 and the guest SD 31 is freely allowed.

Figure 4:
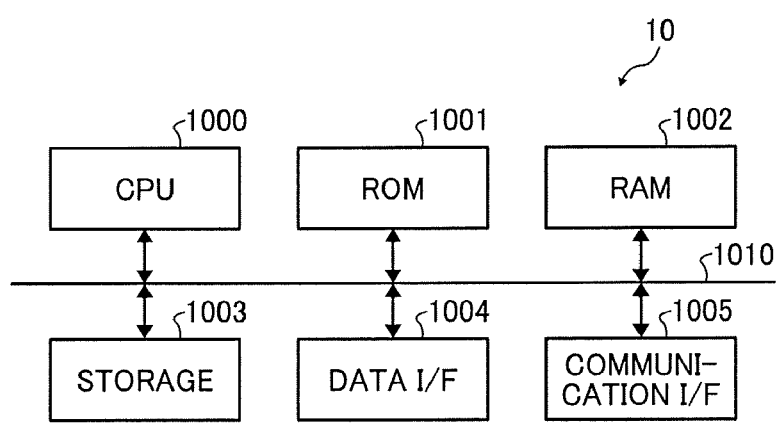
FIG. 4 is a block diagram illustrating a hardware configuration of a communication control apparatus as an embodiment of the present invention.

FIG. 4 is a block diagram illustrating a hardware configuration of the communication control apparatus 10 in this embodiment. In FIG. 4, the communication control apparatus 10 includes a central processing unit (CPU) 1000, a read only memory (ROM) 1001, a random access memory (RAM) 1002, a storage 1003, a data interface (I/F) 1004, and a communication I/F 1005, and those components are communicably connected via a bus 1010 with each other. As described above, the communication control apparatus 10 in this embodiment may be implemented by adopting the configuration similar to generic computers.

The storage 1003 is implemented by using a hard disk drive and a nonvolatile semiconductor memory (such as a flash memory) and stores various programs and data used by the CPU 1000 to operate. In addition, the ROM 1001 preliminarily stores programs and data used by the communication control apparatus 10 to boot up and operate. In accordance with the program stored in the storage 1003 and the ROM 1001, the CPU 1000 operates using the RAM 1002 as a work area and controls the entire communication control apparatus 10. The communication I/F 1005 controls communication via the network 11 under control of the CPU 1000. The data I/F 1004 is an interface to exchange data between an external apparatus such as Universal Serial Bus (USB) etc.

Figure 5:
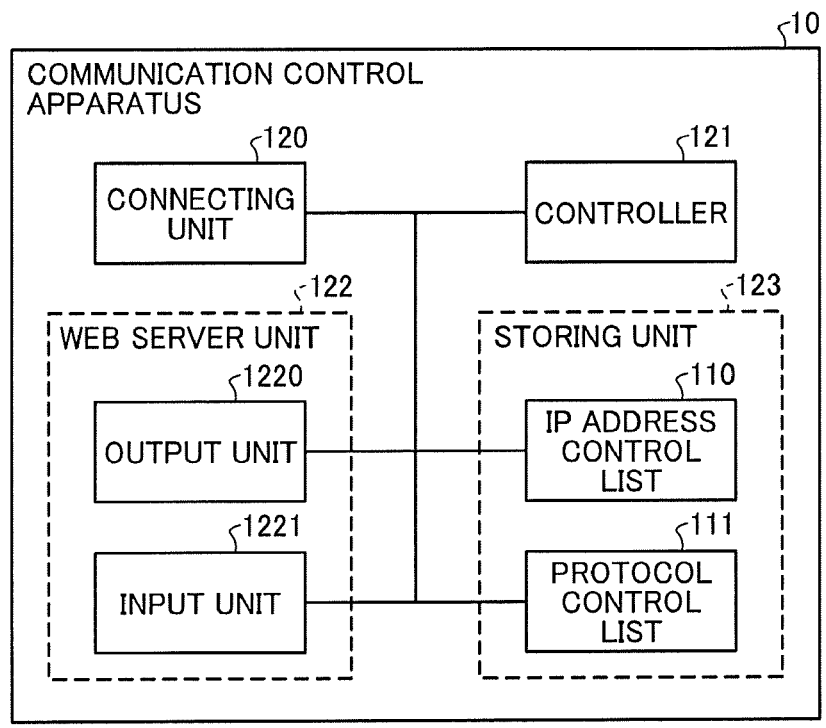
FIG. 5 is a block diagram illustrating functions of the communication control apparatus as an embodiment of the present invention.

FIG. 5 is a block diagram illustrating functions of the communication control apparatus 10 in this embodiment. In FIG. 5, the communication control apparatus 10 includes a transmitter-and-receiver (a communication interface) 120, a controller 121, a web server unit 122, and a storing unit 123. In addition, the web server unit 122 includes an output unit 1220 and an input unit 1221.

Among the components described above, the transmitter-and-receiver 120, the controller 121, the web server unit 122, and the storing unit 123 are implemented by executing a program that runs on the CPU 1000. Otherwise, the transmitter-and-receiver 120, the controller 121, the web server unit 122, and the storing unit 123 described above may be implemented by using hardware circuits that cooperate with each other.

The transmitter-and-receiver 120 connects to the network 11 by controlling the communication I/F 1005 and performs communication via the network 11. The controller 121 controls the entire communication control apparatus 10. The controller 121 includes the functions of the OFC 100 illustrated in FIG. 3. For example, based on the IP address control list 110 and the protocol control list 111 stored in the storing unit 123 (described later), the controller 121 generates the flow entry applied to the flow table 201 included in the OFSs 200a and 200b.

For example, the controller 121 transfers the generated flow entry to the wired SW 20a. The wired SW 20a writes the transferred flow entry in the flow table 201 included in the OFS 200a in the wired SW 20a.

The web server unit 122 corresponds to the web server 101 illustrated in FIG. 3 and provides user interface to outside of the communication control apparatus 10. The web server unit 122 may perform communication compatible with HTTP and FTP via the network 11. In the web server unit 122, the output unit 1220 generates display control information for displaying a predetermined screen on an external terminal apparatus in accordance with description written in HyperText Markup Language (HTML). In addition, after the predetermined screen is displayed (i.e., the display control information is output), in the web server unit 122, the input unit 1221 accepts input information transferred by the external terminal apparatus in accordance with the description written in HTML. The web server unit 122 performs an operation in accordance with the input information accepted by the input unit 1221.

The storing unit 123 corresponding to the list storing unit 102 in FIG. 3 stores the IP address control list 110 and the protocol control list 111 in the recording medium (the storing unit) and reads the IP address control list 110 and the protocol control list 111 from the recording medium. An example of the recording medium that stores the IP address control list 110 and the protocol control list 111 is the storage 1003. The IP address control list 110 is a list of control policies based on the destination IP address as IP address of the destination. Examples of the IP address control list 110 and the protocol control list 111 are described later.

A communication control program for implementing various functions in the communication control apparatus 10 is distributed by being stored in a computer readable medium such as a Compact Disk (CD), flexible disc (FD), Digital Versatile Disk (DVD) etc. in an installable format file or an executable format file. Otherwise, it is possible to store the communication control program in a computer connected to a network such as the Internet and distribute the communication control program by downloading the program via the network. In addition, it is possible to configure the communication control program that may be provided or distributed via the network such as the Internet.

The communication control program distributed and stored in the computer as described above is, for example, distributed to the communication control apparatus 10 from the computer to the communication control apparatus 10 via the data I/F 1004 and stored in the storage 1003 or the ROM 1001.

The communication control program includes modules described above (i.e., the transmitter-and-receiver 120, the controller 121, the web server unit 122, and the storing unit 123). In the actual hardware, after the CPU 1000 reads the communication control program from the recording medium such as the ROM 1001 and the storage 1003 etc. and executes the communication control program, the modules described above are loaded in the main memory such as the RAM 1002, and the transmitter-and-receiver 120, the controller 121, the web server unit 122, and the storing unit 123 are generated on the main memory.

Otherwise, for example, a program that implements basic functions of the web server unit 122 is preliminarily stored in the ROM 1001 or the storage 1003, and it is possible to provide a HTML file that the web server unit 122 reads to the communication control apparatus 10. Similarly, for example, regarding the controller 121 and the storing unit 123, a program that implements basic functions of the controller 121 and the storing unit 123 is preliminarily stored in the ROM 1001 or the storage 1003, and it is possible to provide a parameter etc. for defining operations of the transmitter-and-receiver 120, controller 121, and the storing unit 123 to the communication control apparatus 10.

Figure 6:
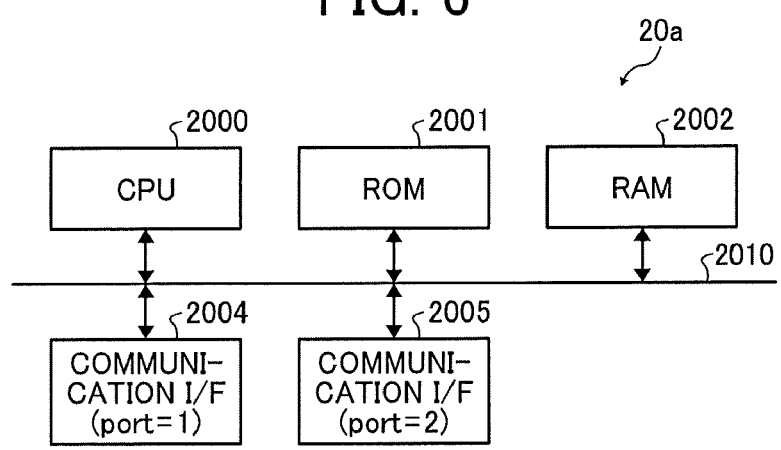
FIG. 6 is a block diagram illustrating a hardware configuration of a wired switch apparatus as an embodiment of the present invention.

FIG. 6 is a block diagram illustrating a hardware configuration of the wired SW 20a in this embodiment. In FIG. 6, the wired SW 20a includes a CPU 2000, the ROM 2001, the RAM 2002, and the communication I/Fs 2004 and 2005, and the components are communicably connected with each other via a bus 2010. Otherwise, it is possible to connect the ROM 2001, the RAM 2002, and the communication I/Fs 2004 and 2005 to the CPU 2000 directly to omit the bus 2010.

The ROM 2001 preliminarily stores programs and data used by the CPU 2000 to operate. In accordance with the program stored in the ROM 2001, the CPU 2000 operates using the RAM 2002 as a work area and controls the entire wired SW 20a. The communication I/Fs 2004 and 2005 control communication respectively under control of the CPU 2000. In FIG. 6, it is assumed that the communication I/F 2004 is connected to the terminal apparatus (such as the guest PC 30) and the communication I/F 2005 is connected to the network 11.

Regarding the wireless AP 20b, except that either one of the communication I/Fs 2004 and 2005 (e.g., the communication IN 2004) supports wireless communication, the wireless AP 20b may be implemented using the configuration similar to the wired SW 20a in FIG. 6. Therefore, detailed description is omitted here. In the description below, the wired SW 20a is used representing the wired SW 20a and the wireless AP 20b if not otherwise specified.

Figure 7:
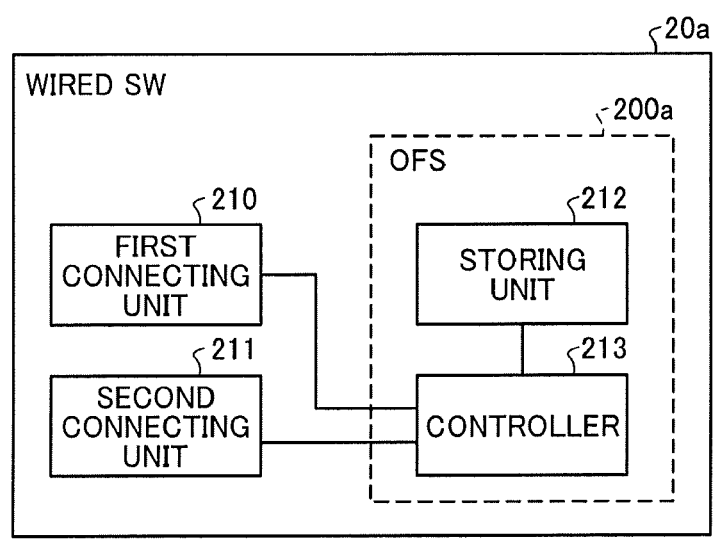
FIG. 7 is a block diagram illustrating functions of the wired switch as an embodiment of the present invention.

FIG. 7 is a block diagram illustrating functions of the wired SW 20a in this embodiment. In FIG. 7, the wired SW 20a includes an OFS 200a, a first transmitter-and-receiver (a first communication interface) 210, and a second transmitter-and-receiver (a second communication interface) 211. The OFS 200a includes a storing unit 212 and a controller 213. Among the components described above, the first transmitter-and-receiver 210, the second transmitter-and-receiver 211, and the controller 213 are implemented by executing a program that runs on the CPU 2000. Otherwise, the first transmitter-and-receiver 210, the second transmitter-and-receiver 211, and the controller 213 described above may be implemented by using hardware circuits that cooperate with each other.

In the OFS 200a, the storing unit 212 stores the flow table 201 in the storage medium and reads the flow table 201 stored in the storage medium. The flow table 201 may be stored in the RAM 2002, or it is possible to use the ROM 2001 adopting a rewritable device. The controller 213 writes the flow entry provided to the wired SW 20a from the OFC 100 in the communication controller 10 via the network 11 in the flow table 201 stored in the storing unit 212. In addition, in accordance with the flow table 201 stored in the storing unit 212, the controller 213 controls communication via the first transmitter-and-receiver 210 and the second transmitter-and-receiver 211.

The first transmitter-and-receiver 210 performs an operation regarding communication by the communication IX 2004, and the second transmitter-and-receiver 211 performs an operation regarding communication by the communication I/F 2005. In this embodiment, it is assumed that the first transmitter-and-receiver 210 corresponds to the communication I/F 2005 and the second transmitter-and-receiver 211 corresponds to the communication I/F 2004. For example, the first transmitter-and-receiver 210 analyzes a packet received by the communication I/F 2004 to extract destination IP address from the header part and passes the extracted destination IP address to the controller 213. With reference to the flow table 201 in accordance with the passed destination IP address, the controller 213 determines whether or not the packet is to be transferred to the network 11 for example.

Examples of the IP address control list 110 and the protocol control list 111 in this embodiment are described below.

Table 2 illustrates the IP address control list 110 (first list) in this embodiment. In Table 2, the IP address control list 110 includes one or more control policies including items such as "destination IP address", "allowed/disallowed", and "priority".

TABLE 2

| Destination IP address | Allowed/disallowed | Priority | Comment |
|---|---|---|---|
| 192.168.1.2 | Allowed | 3 | Printer |
| 192.168.1.0/24 | Disallowed | 2 | Secret network |
| (Default) | Allowed | 1 | |

In the IP address control list 110, destination IP address is described in the item "destination IP address". In Table 2, a control policy specifying one IP address "192.168.1.2" as destination IP address, a control policy specifying IP subnet "192.168.1.0/24" as destination IP address, and a control policy specifying "default" as destination IP address are described.

Among the policies described above, IP subnet "192.168.1.0/24" indicates that 24-bit net mask is specified for IP address. More specifically, IP subnet "192.168.1.0/24" indicates IP addresses 192.168.1.0 to 192.168.1.255. In addition, "default" as destination IP address corresponds to IP address other than IP address specified by other control policies included in the IP address control list 110.

In the IP address control list 110, the item "allowed/disallowed" indicates whether or not access to IP address described in the item "destination IP address" in the control policy is allowed.

The item "priority" indicates priority of each control policy described in the IP address control list 110 respectively. In the IP address control list 110, if the destination IP address included in the packet corresponds to values of items "destination IP address" in multiple control policies, a control policy that the highest priority is configured in the item "priority" is adopted. In Table 2, larger value indicates higher priority. That is, the control policy whose item "destination IP address" corresponds to "192.168.1.2" has the highest priority, and the control policy with the item "default" has the lowest priority.

In Table 2, the item "comment" is an explanation of the control policy, and it is possible to use the item "comment" as a label of each control policy in the IP address control list 110. In Table 2, the first line of the IP address control list 110 is a control policy for the printer 50, and the second line is a control policy for the secret network 40.

As described above, the IP address control list 110 in Table 2 indicates following operations based on IP address in accordance with priorities specified in each control policy. (1) If destination IP address indicates the printer 50 (whose IP address is "192.168.1.2"), it is allowed to perform communication. (2) If destination IP address does not indicate the printer 50 and indicates IP address included in the secret network 40 (whose IP subnet is "192.168.1.0/24"), it is disallowed to perform communication. (3) If destination IP address does not indicate the printer 50 and does not indicate IP address included in the secret network 40, it is allowed to perform communication.

By controlling communication by using the first transmitter-and-receiver 210 and the second transmitter-and-receiver 211 based on the IP address control list 110, the wired SW 20a (the OFS 200a) may appropriately control unicast communication that performs one-to-one communication by designating IP address.

On the other hand, for example, in a network that a user terminal and a printer are connected, if the user terminal performs printing using the printer, it is general that the user terminal finds a printer in the network by using multicast Domain Name System (DNS). In this case, since the multicast DNS is not unicast, it is impossible to control communication appropriately by using the IP address control list 110 only. Furthermore, in order to perform IP communication using Ethernet and wireless LAN in the network, it is required to resolve address using broadcast and Address Resolution Protocol (ARP). Since a packet by ARP is transferred specifying Media Access Control (MAC) address as destination, it is impossible to designate the destination IP address. It is also required that the OFS 200 passes communication using broadcast as described above.

In addition, characteristically, regarding Dynamic Host Configuration Protocol (DHCP) packet and Network Time Protocol (NTP) packet, it is difficult to specify destination using destination IP address.

To cope with this issue, in this embodiment, in order to control communication such as multicast DNS and ARP described above that is insufficient by designating destination IP address, a control policy based on protocol using the protocol control list 111 is further configured.

Table 3 describes the protocol control list 111 (second list) in this embodiment. In Table 3, the protocol control list 111 includes one or more control policies including items such as "identifier type", "value", "allowed/disallowed", and "priority".

In Table 3, the item "comment" is an explanation of the control policy, and it is possible to use the item "comment" as a label of each control policy in the protocol control list 111. In Table 3, the first line of the protocol control list 111 is a control policy for ARP, the second line is a control policy for Internet Group Management Protocol (IGMP), and the third line is a control policy for multicast DNS.

TABLE 3

| Identifier type | Value | Allowed/disallowed | Priority | Comment |
|---|---|---|---|---|
| Type | 0x0806 | Allowed | 3 | ARP |
| IP protocol number | 2 | Allowed | 2 | IGMP |
| UDP port number | 5353 | Allowed | 1 | Multicast DNS |

In the protocol control list 111, the item "identifier type" indicates a type of a protocol identified by a value described in the subsequent item "value" in the control policy.

In Table 3, in the control policy in the first line, the item "identifier type" corresponds to "type" indicating Ethernet (registered trademark) type, and the item "value" indicates "0x0806". As a result, it is known that the control policy designates a protocol indicated by the type number "0x0806" among Ethernet type. In the type number "0x0806", the string "0x" indicates that the subsequent string is described in hexadecimal format. In addition, in the item "comment" in the control policy, it is indicated that the protocol specified for the control policy is "ARP".

Here, Ethernet type is one of identifiers that identify protocol transferred using Ethernet supervised by the organization referred to as Internet Assigned Numbers Authority (IANA). Ethernet is a communication specification specified by IEEE 802.3 and corresponds to the physical layer and the data link layer in the OSI reference model. The Ethernet type is a transmission protocol identifier (identification information) for identifying protocol transmitted in the data link layer.

Similarly, in the control policy in the second line, the item "identifier type" corresponds to "IP protocol number", and the item "value" corresponds to "2". As a result, it is known that the control policy designates a protocol indicated by the value "2" among IP protocol numbers. In addition, in the item "comment" in the control policy, it is indicated that the protocol specified for the control policy is "IGMP".

Furthermore, similarly, in the control policy in the third line, the item "identifier type" corresponds to "UDP port number", and the item "value" corresponds to "5353". As a result, it is known that the control policy designates a protocol indicated by the value "5353" among UDP port numbers. In addition, in the item "comment" in the control policy, it is indicated that the protocol specified for the control policy is "multicast DNS".

In the protocol control list 111, the item "allowed/disallowed" indicates whether or not access using protocol specified by the items "identifier type" and "value" in the control policy is allowed.

In addition, the item "priority" indicates priority of each control policy described in the protocol control list 111 respectively. In Table 3, among protocols corresponding to "type" (Ethernet type), "IP address number", and "UDP port number" respectively, the highest priority "3" is allocated to the control policy describing "type" (Ethernet type) corresponding to the protocol for the lowest layer in the OSI reference model described in Table 1, and the lowest priority "1" is allocated to the control policy describing "UDP port number" corresponding to the protocol for the highest layer in the OSI reference model.

For example, the IP address control list 110 and the protocol control list 111 described above may be edited by the administrator PC 21. Examples of editing the IP address control list 110 and the protocol control list 111 described above are described later.

In many cases, the communication protocol may be determined by using either identifier value included in the header of the packet. Identifiers indicating each protocol respectively are supervised by IANA, and terminal apparatuses perform communication with each other under common rules. For example, if a sender intends to transfer an IP packet, the sender transfers a packet including a header that Ethernet type corresponds to value "0x0800". Based on the Ethernet type value included in the header of the packet, a receiver determines that the packet corresponds to an IP packet, and an appropriate operation is performed.

In many cases, Ethernet type (transmission protocol identifier), IP protocol number, TCP port number, and UDP port number are used as the identifier type. In Table 3, protocols (i.e., ARP, IGMP, and multicast DNS) required for discovering the printer 50 using multicast DNS by the guest PC 30 are described.

Based on the IP address control list 110 and the protocol control list 111 described above, the OFC 100 generates the flow entry included in the flow table 201 that the OFSs 200*a* and 200*b* include. More specifically, by interpreting the IP address control list 110 and the protocol control list 111 described in Tables 2 and 3, the OFC 100 generates the flow entry based on the control policy described in the IP address control list 110 and the protocol control list 111 described above.

Table 4 describes each flow entry generated by the OFC 100 in this embodiment. In Table 4, a port number of the communication I/F 2004 on the terminal apparatus (e.g., guest PC 30) side for the OFS 200 corresponds to "1" (i.e., described as "port=1"), and a port number of the communication I/F 2005 on the network 11 side corresponds to "2" (i.e., described as "port=2"). In addition, Table 4 is described using notation pursuant to OpenFlow 1.0.

TABLE 4

| # | Match | Actions | Priority | Comment |
|---|---|---|---|---|
| 1 | in_port = 2 | Output (port = 1) | 1 | Communication from network to terminal direction |

TABLE 4-continued

| # | Match | Actions | Priority | Comment |
|---|---|---|---|---|
| 2 | in_port = 1, dl_type = 0x0806 | Output (port = 2) | 1003 | ARP is specified as protocol |
| 3 | in_port = 1, dl_type = 0x0800, nw_proto = 2 | Output (port = 2) | 1002 | IGMP is specified as protocol |
| 4 | in_port = 1, dl_type = 0x0800, nw_proto = 17, tp_dst = 5353 | Output (port = 2) | 1001 | Multicast DNS is specified as protocol |
| 5 | in_port = 1, dl_type = 0x0800, nw_dst = 192.168.1.2 | Output (port = 2) | 3 | Printer is specified as destination IP address |
| 6 | in_port = 1, dl_type = 0x0800, nw_dst = 192.168.1.0/24 | Drop | 2 | Secret network is specified as destination IP address |
| 7 | in_port = 1 | Output (port = 2) | 1 | Default for destination IP address |

In Table 4, the item "#" indicates a serial number for each of the flow entry. In this case, seven flow entries identified by serial numbers "1" to "7" are described. Each flow entry includes items "match", "actions", and "priority". Here, the item "comment" indicates explanation for the description of the item "match" and can be omitted in each flow entry.

In Table 4, the item "match" describes a matching rule for the flow entry. In the item "match", it is possible to describe the matching rule for the flow entry by describing multiple conditions determined by using logical product for one flow entry.

If it is determined that the input packet corresponds to the matching rule described in the item "match" of the flow entry, the item "actions" describes an operation that the controller 213 performs on the packet. In Table 4, as operations for a packet, output (Output) and discard (Drop) are defined. In the operation for the packet is output, a port number that the packet is to be output (i.e., port=1 or 2) is described in the item "actions".

In Table 4, the item "priority" describes a priority for each flow entry. The larger priority value indicates the higher priority, and the value "1" corresponds to the lowest priority. Here, the flow entry whose serial number is "1" corresponds to the control policy for communication from the network 11 side to the terminal apparatus side, and the item "match" describes that packets are input to the port (in_port) whose port number is "2" (i.e., in_port=2). In addition, the item "actions" describes that the port whose port number is "1" (port=1) is considered as output (output). As described above, the OFS 200 may perform control that all packets input from the network 11 side are output to the terminal apparatus side.

On the other hand, all of flow entries whose serial numbers are "2" to "7" are control policies for communication from the terminal apparatus side to the network 11 side. Therefore, in the flow entries whose serial numbers are "2" to "7", the item "match" describes that packets are input to the port whose port number is "1" (in_port=1). The input port for each flow entry may preliminarily be configured as an initial value.

In addition, in Table 4, flow entries whose serial numbers are "2" to "4" are flow entries that perform determination in accordance with a specified protocol base on the protocol control list 111 in Table 3. In addition, flow entries whose serial numbers are "5" to "7" are flow entries that perform determination in accordance with destination IP address based on the IP address control list 110 in Table 2. According to the item "priority", in flow entries whose serial numbers are "2" to "4", higher priorities are configured compared to other flow entries.

More specifically, in Table 4, among flow entries based on the protocol control list 111, in the flow entry whose serial number is "2", in the item "match", the port number of the input port (in_port) that packets are input corresponds to "1", and Ethernet type (dl_type) is set to value "0x0806" and ARP is configured. In the item "actions", output (output) from the port whose port number is "2" (port=2) is specified. In addition, the highest priority is configured among flow entries whose serial numbers are "2" to "7".

In the flow entry whose serial number is "3", in the item "match", the port number of the input port (in_port) corresponds to "1" and Ethernet type (dl_type) corresponds to value "0x0800" specifying Internet IP as protocol, and IP protocol number (nw_proto) is further set to value "2" specifying IGMP. In the item "actions", output from the port whose port number is "2" (port=2) is specified. The second-highest priority is configured among flow entries whose serial numbers are "2" to "7".

In the flow entry whose serial number is "4", in the item "match", the port number of the input port (in_port) corresponds to "1" and Ethernet type (dl_type) corresponds to value "0x0800", value "17" is set to IP protocol number (nw_proto) specifying UDP, and destination port number (tp_dst) is further set to value "5353" specifying multicast DNS. In the item "actions", output from the port whose port number is "2" (port=2) is specified. The third-highest priority is configured among flow entries whose serial numbers are "2" to "7" (i.e., the lowest priority among flow entries based on the protocol control list 111 is set).

On the other hand, among flow entries based on the IP address control list 110, in the flow entry whose serial number is "5", in the item "match", the port number of the input port (in_port) corresponds to "1" and Ethernet type (dl_type) corresponds to value "0x0800" specifying Internet IP as protocol, and destination IP address (nw_dst) is set to value "192.168.1.2" specifying the printer 50. In the item "actions", output from the port whose port number is "2" (port=2) is specified. In addition, the highest priority is configured among flow entries based on the IP address control list 110.

In the flow entry whose serial number is "6", in the item "match", the port number of the input port (in_port) corresponds to "1" and Ethernet type (dl_type) corresponds to value "0x0800" specifying Internet IP as protocol, and destination IP address (nw_dst) is set to value "192.168.1.0/24" specifying the secret network 40. In the item "actions", discard (drop) is specified. In addition, the second-highest priority is configured among flow entries based on the IP address control list 110.

In the flow entry whose serial number is "7", in the item "match", only input port (in_port) whose port number is "1" is specified, and in the item "actions", output from the port whose port number is "2" is specified. In addition, the lowest priority is configured among flow entries based on the IP address control list 110.

Next, an operation of editing each of the control lists described above, the IP address control list 110 and the protocol control list 111 and an operation of registering the flow entry described in Table 4 in the OFS 200 are described below in detail.

Figure 8:
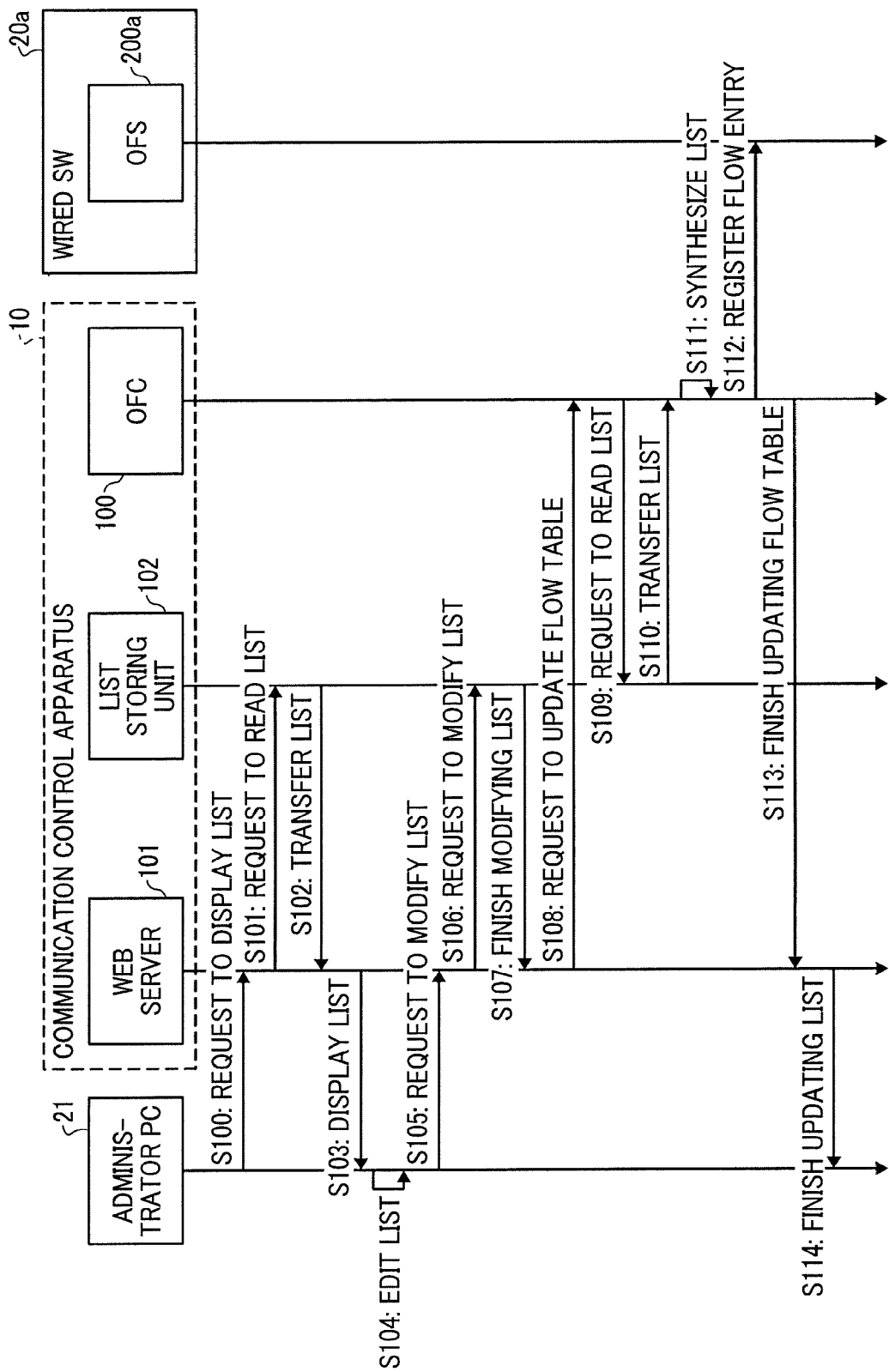
FIG. 8 is a sequence chart illustrating operations of editing a control list and registering a flow entry as an embodiment of the present invention.

FIG. 8 is a sequence chart illustrating operations of editing a control list and registering a flow entry in this embodiment. Here, in FIG. 8, same symbols are assigned to components similar to components in FIG. 3 described before, and detailed descriptions for the components are omitted.

A user (e.g., an administrator) accesses the web server 101 in the communication control apparatus 10 from the administrator PC 21 to request the web server 101 to display each of the control lists (the IP address control list 110 and the protocol control list 111) stored in the list storing unit 102 in S100. In response to the request, the web server 101 requests the list storing unit 102 to transfer each control list in S101 and acquire each control list from the list storing unit 102 in S102. Subsequently, the web server 101 presents an editable display screen displaying each acquire control list to the administrator PC 21 in S103.

Along with user operation in accordance with the displayed screen presented in S103, the administrator PC 21 edits the control list in S104. After accepting user operation indicating that the user finishes editing, the administrator PC 21 requests the web server 101 to modify each of the control lists stored in the list storing unit 102 in accordance with the result of editing in S105.

Operations step S100 to S105 described above are more specifically described below in detail. First, before performing the operation in step S100, the web server 101 displays a list management screen for managing each of the control lists and a menu screen for invoking the list management screen respectively and preliminarily prepares for each display control information (such as a HTML file) for accepting user operation in accordance with the screen. The web server 101 stores each of the HTML files in the storage 1003 for example and allocate a predetermined Uniform Resource Locator (URL) to each HTML file respectively.

The user inputs a URL of the HTML file for displaying the menu screen into a browser application program (hereinafter referred to as browser) that reads files written in HTML and performs predetermined operations installed in the administrator PC 21 to access the web server 101 from the administrator PC 21. In the administrator PC 21, the browser reads the HTML file in accordance with the URL and displays the menu screen on the display of the administrator PC 21 along with the read HTML file.

Figure 9:
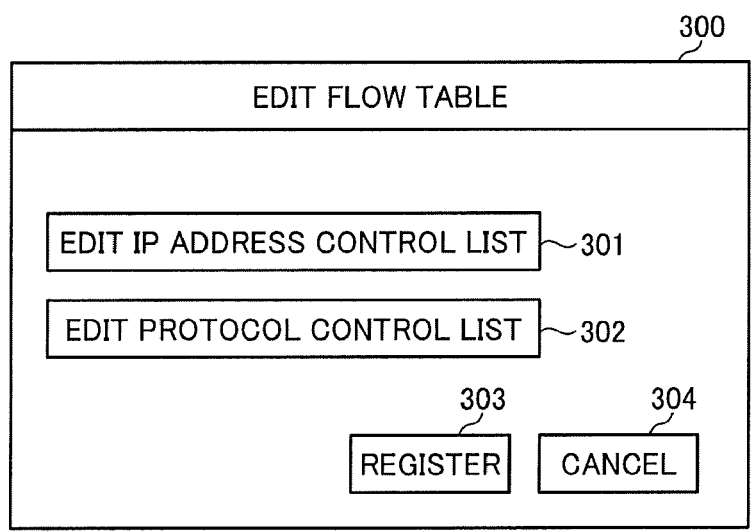
FIG. 9 is a diagram illustrating a menu screen as an embodiment of the present invention.

FIG. 9 is a diagram illustrating a menu screen in this embodiment. In FIG. 9, the menu screen 300 includes buttons 301 to 304. A button 301 is a button for requesting to edit the IP address control list 110, and a button 302 is a button for requesting to edit the protocol control list 111 respectively. After editing the IP address control list 110 and the protocol control list 111 in accordance with user operation on the buttons 301 and 302, the button 303 is a "registration" button for commanding to register the flow entry in accordance with the edited content. In addition, a button 304 is a "cancel" button for canceling the edition performed on the IP address control list 110 and the protocol control list 111.

On the menu screen 300, in accordance with user operation performed on either of the buttons 301 and 302, the administrator PC 21 requests the web server 101 to display the control list corresponding to the operated button in S100. In response to the request, the web server 101 acquires the control list from the list storing unit 102 in steps S101 and S102. The web server 101 presents the list management screen for managing the acquired control list to the administrator PC 21 in S103.

Figure 10:
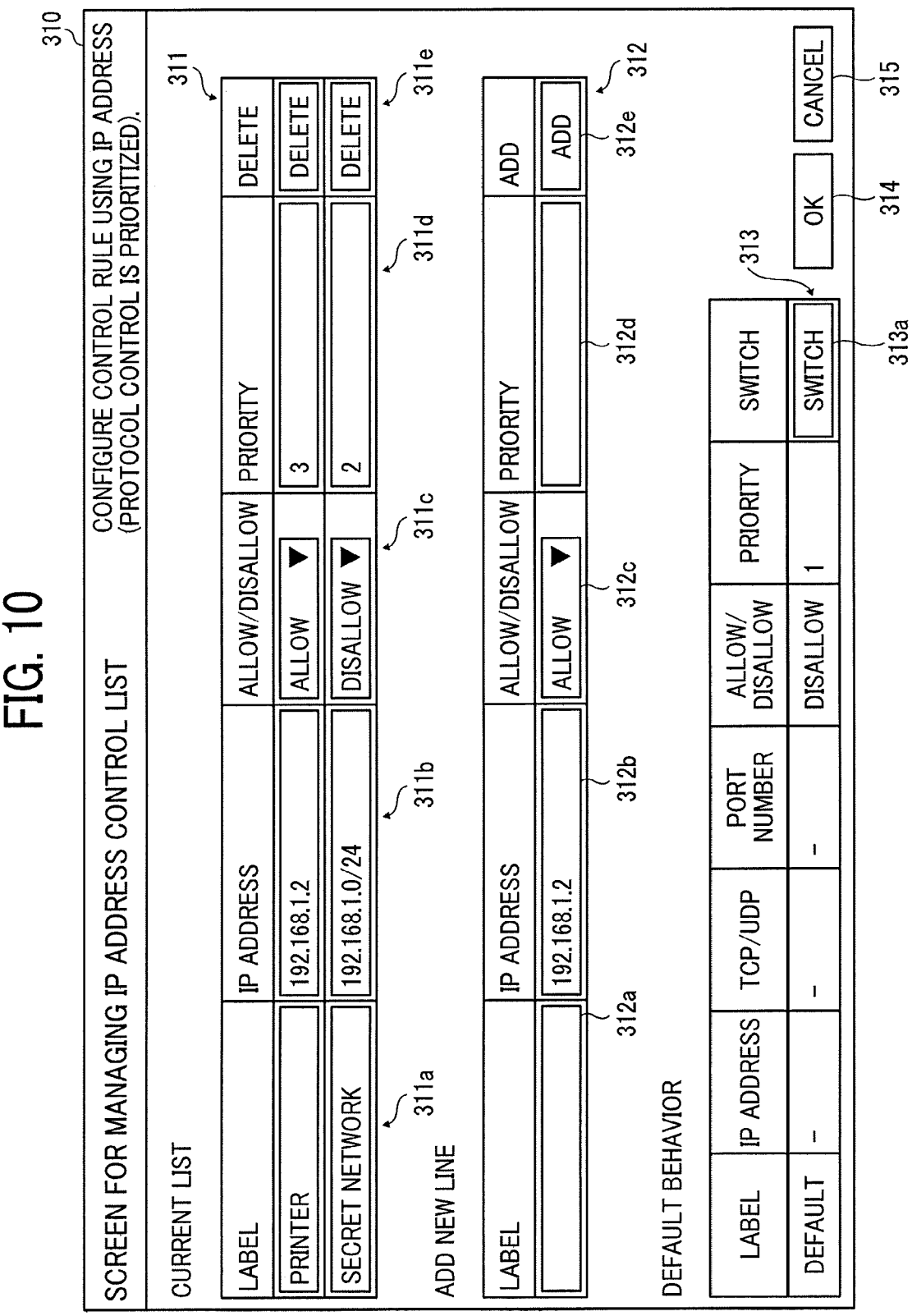
FIG. 10 is a diagram illustrating an IP address control list management screen as an embodiment of the present invention.

The list management screen in this embodiment is described below with reference to FIGS. 10 and 11. FIG. 10 is a diagram illustrating an IP address control list management screen for managing the IP address control list 110 in this embodiment. The IP address control list management screen 310 in FIG. 10 is displayed in accordance with user operation on the button 301 in the menu screen 300. In FIG. 10, the IP address control list management screen 310 includes input areas 311, 312, and 313 and buttons 314 and 315, and regarding each control policy described in Table 2, each item is editable.

In the IP address control list management screen 310, the input area 311 is an area for editing the IP address control list 110 read from the list storing unit 102 by the web server 101. The input area 311 includes input areas 311$a$, 311$b$, 311$c$, and 311$d$ that a displayed content is editable respectively.

Among these components described above, the input area 311$b$ corresponds to the item "destination IP address" in Table 2, the input area 311$c$ corresponds to the item "allowed/disallowed" in Table 2, and the input area 311$d$ corresponds to the item "priority", and regarding each control policy of the IP address control list 110 read from the list storing unit 102, each item value is input and displayed respectively. In this embodiment, in the input area 311$c$ corresponding to the item "allowed/disallowed", either of a predetermined value "allowed" or "disallowed" is to be selected. For example, the input area 311$a$ is an area for inputting a label that the administrator may easily understands the control policy is to be input. In this embodiment, the value of the item "remarks" in Table 2 is input and displayed.

Furthermore, the input area 311 includes a group of buttons 311$e$ including each delete button for commanding to delete the control policy.

In the IP address control list management screen 310, the input area 312 is an area for adding a new control policy to the existing IP address control list 110. Just like the input area 311 described above, the input area 312 includes an input area 312$b$ corresponding to the item "destination IP address" in Table 2, an input area 312$c$ corresponding to the item "allowed/disallowed" in Table 2, and an input area 312$d$ corresponding to the item "priority" in Table 2, an input area 312$a$ for inputting a label, and a button 312$e$ for commanding to add the control policy.

The input area 313 is an area for performing input on the "default" control policy in Table 2. In this embodiment, the input area 313 only includes the button 313$a$ for toggling the value of the item "allowed/disallowed" and does not include an area for inputting other item values.

The button 314 is an "OK" button for ascertaining values input in each of the input areas 311 to 313 and returning to the menu screen 300. The values input in each of the input areas 311 to 313 are temporarily stored in the RAM included in the administrator PC 21 for example. The button 315 is a "cancel" button for discarding values input in each of the input areas 311 to 313 and returning to the menu screen 300.

Figure 11:
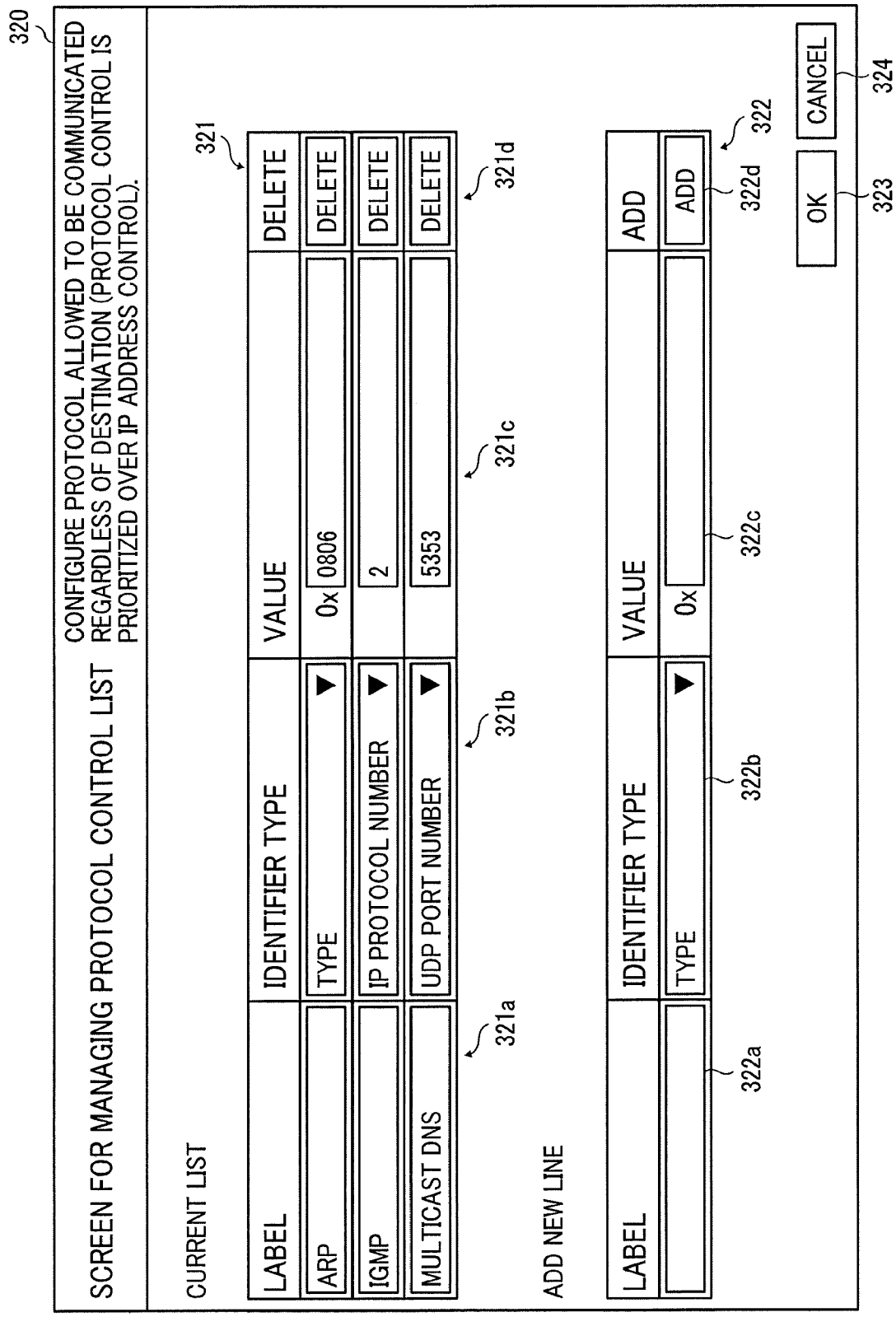
FIG. 11 is a diagram illustrating a protocol control list management screen as an embodiment of the present invention.

FIG. 11 is a diagram illustrating the protocol control list management screen for managing the protocol control list 111 in this embodiment. The protocol control list management screen 320 in FIG. 11 is displayed in accordance with user operation on the button 302 in the menu screen 300. In FIG. 11, the protocol control list management screen 320 includes input areas 321 and 322 and buttons 323 and 324, and regarding each control policy described in Table 3, each item is editable.

In the protocol control list management screen 320, the input area 321 is an area for editing the protocol control list 111 read from the list storing unit 102 by the web server 101. The input area 321 includes input areas 321$a$, 321$b$, and 321$c$ that a displayed content is editable respectively.

Among these components described above, the input area 321*b* corresponds to the item "identifier type" in Table 3 and the input area 321*c* corresponds to the item "value" in Table 3, and regarding each control policy of the protocol control list 111 read from the list storing unit 102, each item value is input and displayed respectively.

In this embodiment, in the input area 321*b* corresponding to the item "identifier type", it is selected either one of predetermined multiple values (such as "Ethernet type", "IP protocol number", and "UDP port number" etc.). It should be noted that "Ethernet type" is displayed as "type" in FIG. 11. In addition, in the input area 321*c* corresponding to the item "value", it is possible to display a guide ("0x" indicating hexadecimal format for "type" in this embodiment) in accordance with the value selected in the corresponding input area 321*b*.

For example, the input area 321*a* is an area for inputting a label that the administrator may easily understands the control policy is to be input. In this embodiment, the value of the item "remarks" in Table 3 is input and displayed.

Furthermore, the input area 321 includes a group of buttons 321*d* including each delete button for commanding to delete the control policy.

Here, it is possible to configure preliminarily the priority of the control policy in the protocol control list 111 for each value configurable in the input area 321*b*. Otherwise, it is possible to determine the priority of the control policy in accordance with the order of displaying the control policy in the input area 321. In addition, it is possible to include an input area for inputting the priority furthermore.

In the protocol control list management screen 320, the input area 322 is an area for adding a new control policy to the existing protocol control list 111. Just like the input area 321 described above, the input area 322 includes an input area 322*b* corresponding to the item "identifier type" in Table 3 and an input area 322*c* corresponding to the item "value" in Table 3, an input area 322*a* for inputting a label, and a button 322*d* for commanding to add the control policy.

The button 323 is an "OK" button for ascertaining values input in each of the input areas 321 to 322 and returning to the menu screen 300. The values input in each of the input areas 321 and 322 are temporarily stored in the RAM included in the administrator PC 21 for example. The button 324 is a "cancel" button for discarding values input in each of the input areas 321 and 322 and returning to the menu screen 300.

Going back to FIG. 8, the administrator PC 21 displays the IP address control list management screen 310 in FIG. 10 and the protocol control list management screen 320 in FIG. 11 on the display of the administrator PC 21 using the browser. In response to user operation in accordance with the IP address control list management screen 310 and the protocol control list management screen 320, the administrator PC 21 edits the IP address control list 110 and the protocol control list 111 in S104.

In response to user operation on the button 303 as the "register" button in the menu screen 300, the administrator PC 21 requests the web server 101 to modify the edited control list respectively in S105. For example, in response to user operation on the button 303, the administrator PC 21 transfers input values input in the IP address control list management screen 310 and the protocol control list management screen 320 to the web server 101. Simultaneously, the administrator PC 21 requests the web server 101 to modify the IP address control list 110 and the protocol control list 111.

In response to the request of modification from the administrator PC 21, the web server 101 passes the input values transferred by the administrator PC 21 to the list storing unit 102 and requests the list storing unit 102 to modify the IP address control list 110 and the protocol control list 111 in S106. The list storing unit 102 modifies the IP address control list 110 and the protocol control list 111 using the input values passed by the web server 101. After finishing the modification, the list storing unit 102 reports to the web server 101 that the modification finishes in S107.

In response to the notification from the list storing unit 102, the web server 101 requests the OFC 100 to update the flow table 201 in S108. In response to the request from the web server 101, the OFC 100 requests the list storing unit 102 to transfer the IP address control list 110 and the protocol control list 111 in S109 and acquires the IP address control list 110 and the protocol control list 111 from the list storing unit 102 in S110.

After merging the IP address control list 110 with the protocol control list 111 acquired in S110, the OFC 100 generates the flow entry based on the control policy described in the IP address control list 110 and the protocol control list 111 described in Table 4 respectively in S111. For example, the OFC 100 transfers the generated flow entry respectively to the OFS 200*a* included in the wired SW 20*a* and requests to register the flow entry respectively in the flow table 201 in S112. In response to the request from the OFC 100 described above, the OFS 200*a* registers the flow entry respectively in the flow table 201 to update the flow table 201.

After requesting the OFS 200*a* to register the flow entry, the OFC 100 reports to the web server 101 that the flow table 201 is updated in S113. In response to the notification from the OFC 100 described above, the web server 101 also reports to the administrator PC 21 that it is finished to modify the control list respectively in S114.

Next, an example of actual communication using the flow table 201 in this embodiment is described below. In this case, by using the flow table 201 including each flow entry described in Table 4 described before, an example of using the printer 50 in the secret network 40 from the guest PC 30 is described below.

Figure 12:
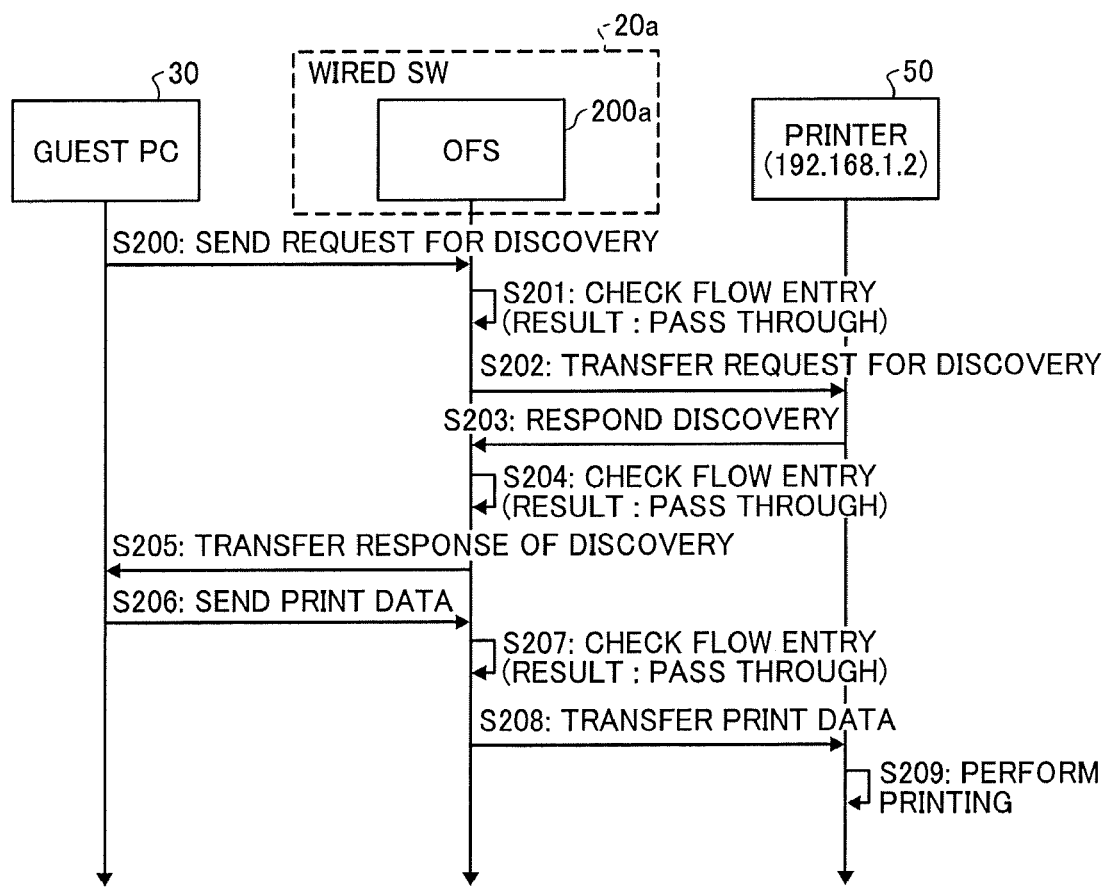
FIG. 12 is a sequence chart illustrating actual communication using a flow table as an embodiment of the present invention.

FIG. 12 is a sequence chart illustrating actual communication using the flow table 201 in this embodiment. Here, in FIG. 12, same symbols are assigned to components similar to components in FIG. 3 described before, and detailed descriptions for the components are omitted.

After connecting the guest PC 30 to the wired SW 20*a*, the guest PC 30 transfers a request of discovery to the network 11 to search for an available apparatus. The guest PC 30 transfers the request of discovery specifying multicast DNS as a protocol in S200. The packet including the request is received by the communication I/F 2004 whose port number is "1" in the wired SW 20*a* and passed to the OFS 200*a*.

The OFS 200*a* checks each flow entry included in the flow table 201 based on the header information included in the transferred packet and the input port (port=1) in S201. In accordance with the value of the item "priority" in each flow entry, the OFS 200*a* checks flow entries in order of the serial numbers "2", "3", and "4" etc. in Table 4 sequentially. After performing the check, the OFS 200*a* determines that the flow entry specifying multicast DNS as the protocol whose serial number is "4" matches, and in accordance with the value "output (port=2)" in the item "actions", the OFS 200*a* passes through the packet. As a result, the request of discovery transferred by the guest PC 30 is transferred to the network 11 in S202.

In this case, in response to the request of discovery transferred to the network 11, the printer 50 is discovered, and as a response to the request of discovery, a packet including IP address of the printer 50 "192.168.1.2" is transferred from the printer 50 to the wired SW 20a in S203. The packet including IP address of the printer 50 is received by the communication I/F 2005 whose port number is "2" in the wired SW 20a and passed to the OFS 200a. The OFS 200a checks flow entries included in the flow table 201 respectively in S204. In this case, since the input port is "port=2", it is determined that the flow entry whose serial number "1" matches, and in accordance with the value "output (port=1)" in the item "actions", the packet is passed through.

The packet including the response to the request of discovery is output by the wired SW 20a and received by the guest PC 30 in S205. As a result, the guest PC 30 may understand that the printer 50 whose IP address is "192.168.1.2" is available.

Next, an example that the guest PC 30 transfers print data to the printer 50 whose IP address is "192.168.1.2" and commands the printer 50 to print the print data is described below. The guest PC 30 divides the print data by a predetermined size and packs each of the divided print data into a packet sequentially. Subsequently, the guest PC 30 sets IP address "192.168.1.2" as destination IP address to header information of each packet and transfers the packet to the wired SW 20a in S206.

The packet transferred by the guest PC 30 is received by the communication I/F 2004 whose port number is "1" in the wired SW 20a and passed to the OFS 200a. The OFS 200a checks each flow entry included in the flow table 201 based on the header information included in the transferred packet and the input port (port=1) in S207. In accordance with the value of the item "priority" in each flow entry, the OFS 200a checks flow entries in order of the serial numbers "2", "3", and "4" etc. in Table 4 sequentially.

After performing the check, the OFS 200a determines that the flow entry whose serial number is "5" and destination IP address is "192.168.1.2" matches. In accordance with the determination result and the value "output (port=2)" in the item "actions" of the flow entry, the OFS 200a passes through the packet. As a result, the print data transferred by the guest PC 30 is transferred from the wired SW 20a to the printer 50 via the network 11 in S208. The printer 50 performs printing in accordance with the print data transferred by the guest PC 30 in S209.

As described above, in this embodiment, the control list using the matching rule in accordance with the specification of the destination IP address and the control list using the matching rule in accordance with the protocol are generated respectively, and it is controlled to exchange packets with the external terminal apparatus in combination with the two control lists. In this case, each of the control lists may be edited using user interface provided by the web server 101 from the administrator PC 21. Consequently, by adopting the communication system 1 in this embodiment, it is easily possible to implement the configuration that the external terminal apparatus (outside the organization) may use the specific network resource within the organization LAN.

Second Embodiment

Next, the second embodiment is described below. In the first embodiment described above, the communication from the external terminal apparatus toward the network 11 is mainly controlled. In this embodiment, in addition to the control described in the first embodiment, communication from the network 11 toward the external terminal apparatus is also controlled.

It should be noted that the configuration of the communication system 1 described above with reference to FIG. 3 may be applied in this embodiment as is. In addition, the IP address control list 110 described before with reference to Table 2 and the protocol control list 111 described before with reference to Table 3 may be applied in this embodiment as is. Furthermore, the operations described before with reference to FIGS. 8 and 12 may be applied in this embodiment as is.

Table 5 describes each flow entry in this embodiment. Meanings of each item described in Table 5 are similar to the items in Table 4 described before, so the descriptions for those items are omitted in this case.

TABLE 5

| # | Match | Actions | Priority | Comment |
|---|---|---|---|---|
| 1 | in_port = 2,<br>dl_type = 0x0806 | Output<br>(port = 1) | 1003 | Communication from network to terminal direction/ARP is specified as protocol |
| 2 | in_port = 2,<br>dl_type = 0x0800,<br>nw_proto = 2 | Output<br>(port = 1) | 1002 | Communication from network to terminal direction/IGMP is specified as protocol |
| 3 | in_port = 2,<br>dl_type = 0x0800,<br>nw_proto = 17,<br>tp_dst = 5353 | Output<br>(port = 1) | 1001 | Communication from network to terminal direction/Multicast DNS is specified as protocol |
| 4 | in_port = 2,<br>dl_type = 0x0800,<br>nw_dst = 192.168.1.2 | Output<br>(port = 1) | 3 | Communication from network to terminal direction/Printer is specified as destination IP address |
| 5 | in_port = 2,<br>dl_type = 0x0800,<br>nw_dst = 192.168.1.0/24 | Drop | 2 | Communication from network to terminal direction/Secret network is specified as destination IP address |
| 6 | in_port = 2 | Output<br>(port = 1) | 1 | Communication from network to terminal direction/Default for destination IP address |
| 7 | in_port = 1,<br>dl_type = 0x0806 | Output<br>(port = 2) | 1003 | Communication from terminal to network direction/ARP is specified as protocol |
| 8 | in_port = 1,<br>dl_type = 0x0800,<br>nw_proto = 2 | Output<br>(port = 2) | 1002 | Communication from terminal to network direction/IGMP is specified as protocol |
| 9 | in_port = 1, | Output | 1001 | Communication |

TABLE 5-continued

| # | Match | Actions | Priority | Comment |
|---|---|---|---|---|
|   | dl_type = 0x0800, nw_proto = 17, tp_dst = 5353 | (port = 2) |   | from terminal to network direction/ Multicast DNS is specified as protocol |
| 10 | in_port = 1, dl_type = 0x0800, nw_dst = 192.168.1.2 | Output (port = 2) | 3 | Communication from terminal to network direction/ Printer is specified as destination IP address |
| 11 | in_port = 1, dl_type = 0x0800, nw_dst = 192.168.1.0/24 | Drop | 2 | Communication from terminal to network direction/ Secret network is specified as destination IP address |
| 12 | in_port = 1 | Output (port = 2) | 1 | Communication from terminal to network direction/ Default for destination IP address |

In Table 5, just like the first embodiment, flow entries identified by the serial numbers "7" to "12" are for controlling communication from the external terminal apparatus toward the network 11 and similar to the flow entries identified by the serial numbers "2" to "7" in Table 4 respectively. By contrast, flow entries identified by the serial numbers "1" to "6" are for controlling communication from the network 11 toward the external terminal apparatus, counterchanging the input port with the output port regarding the flow entries identified by the serial numbers "7" to "12" in Table 5.

Along with counterchanging the input port with the output port, the destination is counterchanged with the source. More specifically, in Table 5, a destination port number (tp_dst) specified in the item "match" of the flow entry identified by the serial number "9" is counterchanged with a source port number (tp_src) while the value "5353" is kept. Similarly, a destination IP address (nw_dst) specified in the item "match" of the flow entry identified by the serial number "11" is counterchanged with a source IP address (nw_src) while the value "192.168.1.2" is kept.

As it is known from the description above, it is possible to generate each flow entry described in Table 5 based on the IP address control list 110 and the protocol control list 111 identical to each flow entry in Table 4.

As described above, by generating flow entry respectively, it is possible to perform communication bi-directionally between the external terminal apparatus and the destination within the organization LAN allowed to be communicated. By blocking communication bi-directionally other than the allowed destinations, it is possible to prevent the case that the external terminal apparatus receives unintended information, enhancing security.

The embodiments described above provide the communication control apparatus that may implement the control that the guest terminal may use the specific network resource within the organization LAN easily.

Note that the above-described embodiments are examples of embodiments of the claimed invention, and the embodiments of the claimed invention are not limited to the above-described embodiments. The above-described embodiments can be variously modified within the scope of the claimed invention.

For example, elements and/or features of different illustrative embodiments may be combined with each other and/or substituted for each other within the scope of this disclosure and appended claims.

The present invention also encompasses a communication control method performed by a communication control apparatus. The method includes the steps of outputting display control information to display a first list and a second list, the first list including a first condition that associates an address indicating a location on a network with information indicating whether or not to allow communication with a destination identified with the address, and the second list including a second condition that associates identification information identifying a communication protocol with information indicating whether or not to allow communication using the communication protocol, receiving an input of a request to modify the first list and the second list being displayed, generating communication control information in accordance with the first list and the second list each being modified in response to the request, and transferring the communication control information being generated via the network to a transfer apparatus, to cause the transfer apparatus to control communication to be performed via a first communication interface for connecting the network and a second communication interface for connecting a terminal apparatus in accordance with the communication control information being transferred.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication control apparatus, comprising:
   a memory to store:
      a first list including a first condition that associates an address indicating a location on a network with information indicating whether or not to allow communication with a destination identified with the address, independent of a particular communication protocol; and
      a second list, different from the first list, including a second condition that associates identification information identifying a communication protocol with information indicating whether or not to allow communication using the communication protocol independent of a particular device address; and
   circuitry configured to:
      output display control information that causes a display to display the first list and the second list;
      receive an input of a request to modify the first list and the second list being displayed;
      generate communication control information in accordance with the first list and the second list, each having been modified in response to the input request; and
      transfer the generated communication control information via the network to a transfer apparatus, to cause the transfer apparatus to control communication to be performed via a first communication interface for connecting the network and a second communication interface for connecting a terminal apparatus in accordance with the transferred communication control information,
   wherein the first communication interface is regarded as a destination and the second communication interface is regarded as a source in the first list and the second list, respectively, and
   the circuitry is further configured to
      control one-way communication from the second communication interface to the first communication interface in accordance with the first list and the second list;
      allow one-way communication from the first communication interface to the second communication interface regardless of the first list and the second list;
      control one-way communication from the first communication interface to the second communication interface in accordance with the first list whose source and destination are replaced with each other and the second list whose source and destination are replaced with each other; and
      allow one-way communication from the second communication interface to the first communication interface regardless of the first list whose source and destination are replaced with each other and the second list whose source and destination are replaced with each other.

2. The communication control apparatus according to claim 1, wherein, in the first list stored in the memory, either one of the address being single and a part of the address is specified as a destination depending on the first condition.

3. The communication control apparatus according to claim 1, wherein, in generating the communication control information, the circuitry is further configured to set a priority for controlling communication by the transfer apparatus via the first communication interface and the second communication interface, respectively, to the first condition included in the first list and the second condition included in the second list.

4. The communication control apparatus according to claim 3, wherein the priority set to the second condition by the circuitry is higher than the priority set to the first condition.

5. The communication control apparatus according to claim 1, wherein the identification information in the second list in the memory includes at least one of a transmission protocol identifier, an IP protocol identifier, a TCP port number, and a UDP port number.

6. A communication system, comprising:
   a control apparatus; and
   a transfer apparatus, wherein the control apparatus includes:
   a first memory to store:
      a first list including a first condition that associates an address indicating a location on a network with information indicating whether or not to allow communication with a destination identified with the address, independent of a particular communication protocol; and
      a second list, different from the first list, including a second condition that associates identification information identifying a communication protocol with information indicating whether or not to allow communication using the communication protocol independent of a particular device address, and
   first circuitry configured to:
      output display control information that causes a display to display the first list and the second list;
      receive an input of a request to modify the first list and the second list being displayed;
      generate communication control information in accordance with the first list and the second list, each having been modified in response to the request; and
      transfer the generated communication control information to the transfer apparatus via the network, and
   the transfer apparatus includes:
      a first communication interface to connect to the network;
      a second communication interface to connect to a terminal apparatus;
      a second memory to store the communication control information transferred by the control apparatus; and
      second circuitry to control communication performed via the first communication interface and the second communication interface in accordance with the communication control information stored in the second memory,
   wherein the first communication interface is regarded as a destination and the second communication interface is regarded as a source in the first list and the second list, respectively, and
   the first circuitry is further configured to
      control one-way communication from the second communication interface to the first communication interface in accordance with the first list and the second list;

allow one-way communication from the first communication interface to the second communication interface regardless of the first list and the second list;

control one-way communication from the first communication interface to the second communication interface in accordance with the first list whose source and destination are replaced with each other and the second list whose source and destination are replaced with each other; and allow one-way communication from the second communication interface to the first communication interface regardless of the first list whose source and destination are replaced with each other and the second list whose source and destination are replaced with each other.

7. A non-transitory, computer-readable recording medium storing a program that, when executed by processing circuitry of an communication control apparatus, causes the processing circuitry to implement a method of controlling communication, comprising:

outputting display control information causing a display to display a first list and a second list, the first list including a first condition that associates an address indicating a location on a network with information indicating whether or not to allow communication with a destination identified with the address, independent of a particular communication protocol, and the second list, different from the first list, including a second condition that associates identification information identifying a communication protocol with information indicating whether or not to allow communication using the communication protocol independent of a particular device address;

receiving an input of a request to modify the first list and the second list being displayed;

generating communication control information in accordance with the first list and the second list, each having been modified in response to the request; and transferring the generated communication control information via the network to a transfer apparatus, to cause the transfer apparatus to control communication to be performed via a first communication interface for connecting the network and a second communication interface for connecting a terminal apparatus in accordance with the transferred communication control information, wherein the first communication interface is regarded as a destination and the second communication interface is regarded as a source in the first list and the second list, respectively, and the method further includes controlling one-way communication from the second communication interface to the first communication interface in accordance with the first list and the second list;

allowing one-way communication from the first communication interface to the second communication interface regardless of the first list and the second list;

controlling one-way communication from the first communication interface to the second communication interface in accordance with the first list whose source and destination are replaced with each other and the second list whose source and destination are replaced with each other; and allowing one-way communication from the second communication interface to the first communication interface regardless of the first list whose source and destination are replaced with each other and the second list whose source and destination are replaced with each other.

8. The communication control apparatus of claim 1, wherein the memory stores the first list, which does not include information regarding any communication protocols.

9. The communication control apparatus of claim 1, wherein the memory stores the second list, which does not include information regarding any addresses of devices on the network.

* * * * *